Patented Oct. 26, 1943

2,332,519

UNITED STATES PATENT OFFICE 2,332,519

CASEIN RESIN PRODUCT AND PREPARATION THEREOF

Carl S. Leonardson and Donald J. White, Seattle, Wash., assignors to The Borden Company, New York, N. Y., a corporation of New Jersey No Drawing. Application May 3, 1940,
Serial No. 333,244

17 Claims. (Cl. 260—6)

This invention relates to casein-urea-formaldehyde resin type reaction products that are especially suitable for use as wood glues, but that also may be used as sizing or finishing materials for wood, cloth, paper and the like, and to methods of preparing and using such reaction products.

Urea-formaldehyde resin glues have been used heretofore for gluing wood, laminating of veneers to form plywood and the like. Such materials are condensation products known as resin glues and are usually marketed as aqueous solutions containing about 60% solids and having a viscosity at 70° F. of about 125 R. P. M. taken on a Stormer viscosimeter using a 500 gram weight. During the condensation reaction of urea and formaldehyde, the condensation product resulting from reaction of these ingredients at elevated temperatures gradually becomes more and more viscous as the condensation proceeds. In order to obtain the desired viscosity in the product for wood gluing, however, it is necessary to evaporate water from the material at some stage during the condensation or after the condensation is completed. If the condensation of a straight urea-formaldehyde product is carried out without evaporating water, the product forms an irreversible gel before a Stormer viscosity of 125 R. P. M. is reached. The usual practice, therefore, in order to obtain a final product having the requisite viscosity and useful life, has been to arrest the reaction well before the final viscosity has been reached and then to remove rapidly a relatively large amount of water, usually by evaporation under reduced pressure. This procedure necessarily gives a final product containing a relatively large amount of solids and increases the cost of the product.

These glues can be stored at a temperature of 70° F. or lower for fairly long periods of time but they become gradually thicker and more viscous until at last the product changes into a gel that is useless as a glue. Temperature has a marked effect on this useful liquid life, however, and serious problems are presented when it is necessary to store the glues in southern climates because the glues gel much more readily when stored at temperatures above 70° F.

When these glues become too thick, they can be thinned out to some extent by the addition of water if a gel has not formed, but the addition of even small quantities of diluting water have an extremely marked effect on the viscosity. For example, a urea-formaldehyde resin glue with a solids content of 60% and a Stormer viscosity of 87 will, when diluted with water to a solids content of 50%, have a Stormer viscosity of 600. Too much water cannot be added, however, for thinning purposes. For example, the addition of four parts of water to such a glue will precipitate most, if not all, of the resinous material.

As a urea-formaldehyde resin glue is diluted with water and it becomes thinner, its bonding strength and also its general value as a glue for holding veneers of wood together is diminished. For example, veneers glued together under a standard hot pressing procedure with each of the above urea-formaldehyde resin glues of 60% and 50% solids contents, respectively, gave the following results when the usual strength tests made in testing plywood in a Riehle testing machine were carried out. In each case, the same amount of glue on a dry basis was spread on the wood veneers.

Table I

| Type of glue | Viscosity | Dry strength | Wet strength |
|---|---|---|---|
| 60% solids glue | 87 | 215-90 | 190-60 |
| 50% solids glue | 600 | 155-45 | 140-25 |

The first figure in each of the above tests indicates the strength of the plywood strips that were broken in a Riehle testing machine. The second figures after the hyphens in the results given above in each case indicate the percentage of broken fibre that appeared on the broken test piece. The wet shear tests were made after the plywood strips had been soaked in cold water for 48 hours.

It will be apparent from this example that with the straight urea-formaldehyde resin glues, the strength of the glue for purposes of gluing wood veneers together in making plywood diminishes rapidly as the glue is thinned out by dilution with water. In addition, the glue loses the desired spreading qualities as it is diluted and becomes thinner.

It is an object of our invention to provide a urea-formaldehyde type of resin product having the viscosity and consistency required for wood gluing operations which can be prepared without evaporating water from the product at any stage of its preparation, thereby producing a final product containing substantially smaller quantities of solids than are present in the usual straight urea-formaldehyde resin glues.

Another object of the invention is to provide such a resin having good spreading qualities and a low solids content that also has a high bonding strength.

A further object is the provision of such a new urea-formaldehyde type resin having a long useful life when stored at room temperature together with an unusually long life for such a product when stored at higher temperatures.

Another object is to provide a urea-formaldehyde type of resin to which large quantities of water can be added without precipitating the resinous material.

Another object is to provide such a resin which can be used for gluing veneers of wood together to make plywood, and which, after setting, furnishes a more flexible or less brittle glue film.

Another object is the provision of methods of making and using these new resin type adhesives having one or more of the foregoing advantageous properties.

Other objects and advantages will be apparent or will be explained in conjunction with the following description of various embodiments of the invention.

In accordance with this invention, a resin type product is prepared by reacting casein with a suitable urea and a suitable aldehyde, such as formaldehyde. It has been discovered that eminently satisfactory glues can be prepared by condensing these ingredients without evaporating water during the condensation, or after its completion, and that the resulting products have a very low solids content, high bonding strengths, good viscosities for wood gluing and a long useful life at elevated temperatures as well as at normal room temperature.

Such a casein-urea-formaldehyde glue prepared according to this invention will remain for several months in a liquid condition and during this time may be diluted with large amounts of water without precipitating the resinous material. For example, 10 parts of water can be added to such a casein-urea-formaldehyde glue without any precipitation, whereas four parts of water added to a straight urea-formaldehyde glue will precipitate most of the resinous matter. Such a glue may also be dried, as for example by spray drying according to any of the well known spray drying processes, and the resulting dried powder may be reconstituted easily into a satisfactory glue by the addition of water.

Various diluting or extending agents, such as cereal flours, normal low grade wheat flour or rye flour, and starch as well as other materials known to be useful as extenders for straight urea-formaldehyde glues may be mixed with glue of this invention after they are prepared. In fact, these new glues are capable of being mixed with exceptionally large amounts of extenders or filler materials without seriously impairing their bonding strengths.

The procedure for preparing resin products according to this invention comprises forming a solution of casein and heating this solution with a urea and an aldehyde at a condensing temperature until the desired viscosity is reached. One convenient method of preparing the solution of casein is to employ the urea as a solvent or dissolving agent. While the invention is not to be limited by any theory as to the reactions taking place, it is believed that the urea and casein in the water form a urea-caseinate that is soluble. All of the urea may be combined thus with the casein prior to condensation, or only a portion of the urea may be used for this purpose with the balance added afterward. Various alkaline solvent agents may be used in forming the casein solution instead of the urea. For example, the casein may be dissolved in an aqueous solution of caustic soda, soda ash, ammonia, or other alkalies known to aid in dissolving casein.

The separately prepared casein solution can now be mixed with the formaldehyde, and with additional urea if this is needed. It is surprising that the casein is not precipitated from solution by the formaldehyde in view of its well known sensitivity to this compound, but the presence of the urea apparently is sufficient to maintain the casein in solution even in the presence of formaldehyde. The pH of the casein-urea-formaldehyde solution preferably is adjusted to approximately 7 by the addition of any suitable alkali before condensation is started.

The ingredients may now be heated in a suitable refluxing apparatus to a condensing temperature, preferably somewhat above 200° F., and after a few minutes of reaction, the pH may be lowered to around 5.5 by the addition of a weak acid. These two adjustments of pH are not essential, although condensation should be carried out while the material is slightly acid. The pH employed affects the rate of condensation with the reaction proceeding faster at the lower pH values. The condensation reaction is continued after any adjustment of pH that may be necessary until the reaction is nearly completed, and the product is then neutralized and cooled to room temperature to arrest the condensation.

The point at which to neutralize and cool the product may be determined by obtaining samples of the product from time to time and testing them for viscosity. Keeping in mind that the reaction is proceeding while such a sample is being cooled and tested and also while the main body of the product is being cooled, an allowance should be made in selecting the viscosity of the sample tested which will produce the desired viscosity in the final product. Usually the reaction is stopped in time to obtain a final cooled product having a viscosity of about 50 to 200 R. P. M. on a Stormer viscosimeter using a 500 gram weight with the glue at 70° F. While this is a preferred range of viscosity for the final product, it is to be understood that the reaction may be stopped to obtain a higher or lower final viscosity, if desired. When the product is neutralized to arrest the condensation, sufficient alkali is usually added to the product to render it slightly alkaline with a pH, for example, of about 7 to 8.5.

The term "a urea," as employed in the specification and claims, is intended to include not only the chemical compound $NH_2 \cdot CO \cdot NH_2$ but also other ureas such as phenyl urea and thiourea and the amides such as acetamide known to react with formaldehyde by condensation. The terms "aldehyde" and "formaldehyde," as used in the specification and claims, are intended to include the various aldehydes that are suitable for producing resins by condensation with urea, such as paraformaldehyde and other polymers of formaldehyde and formaldehyde liberating compounds.

The proportions of casein to the urea and formaldehyde may be varied within rather wide limits as will be apparent from the examples given below. While the invention is not limited thereto, it is usually desirable to employ about 10 to 100 parts by weight of casein for each 100 parts of the urea. In regard to the proportions of urea and formaldehyde, this may be varied, as is understood by those skilled in the art, good results being obtained by using a mole ratio of about 1 mol of urea to about 1.7 to 2.2 mols of formaldehyde.

By way of example and without limiting the invention in any way, the following examples of the preparation of casein-urea-formaldehyde reaction products according to this invention are given.

EXAMPLE 1

25 lbs. of cold or warm water are placed in a convenient mixer that is preferably jacketed for steam and is fitted with a slow moving agitator. 25 lbs. of ordinary, commercial, ground casein, which may be ground to 24 mesh or 50 mesh if desired, is added to the water, the agitators started, and the casein mixed into the water in order to wet the particles. We then add 25 lbs. of commercial urea to the mixer and continue to mix until the casein is completely dissolved. The mixture is preferably heated to about 120 or 130° F. during the mixing in order to hasten the solution of the casein. The resulting solution is believed to be a casein-urea chemical reaction product which we call a urea-caseinate.

When the preparation of the urea-caseinate is complete as indicated above, we proceed as follows: Into a properly jacketed kettle, preferably fitted with a reflux condenser and with a proper stirring apparatus, we place 270 lbs. of commercial formaldehyde, preferably containing between 37 and 40% free formaldehyde. To this formaldehyde we add 75 lbs. of commercial urea and 75 pounds of the urea-caseinate solution prepared as described above. These materials are stirred together until a completely homogeneous mixture results. Thereafter, a determination of the pH of the resulting solution is made and adjusted by the addition of a water soluble alkaline material to a substantially neutral point or a pH of about 7. A solution of caustic soda or trisodium phosphate may be used for this purpose. After this adjustment of the pH has been made, steam is turned into the jacket of the kettle to bring the mixture to a temperature of about 209° F. and the temperature held at about this point during the reaction. As the reaction proceeds, it is preferable to let any condensate return to the kettle by means of the reflux condenser. After refluxing for about 15 or 20 minutes, a sample of the liquid is removed from the kettle and its pH is determined. The pH may now be about 6 or 6.5, for example. In any case, by means of an acid, such as a weak formic acid, acetic acid or phosphoric acid, we may adjust the contents of the kettle to a pH of around 5.5 in order to hasten the condensation reaction. Thereafter the heating is continued and the solution held at about 209° F. until a sample of the material shows a viscosity on the Stormer viscosimeter with a 500 gram weight and with the glue at 70° F. of approximately 200 R. P. M. When approximately this viscosity is reached, the solution is neutralized with any suitable alkaline material, for example caustic soda, to a pH of about 7.0 to 8.5. After this final pH adjustment, the resulting glue is cooled by any means to 70° F. when it is finished and may be removed from the kettle and packed in suitable containers for commercial use. The resulting glue is opaque, of a uniform consistency, possessing a good flowing quality and containing approximately 44 to 46% solids, 51 to 53% water, there being about 3% of free formaldehyde in the finished glue. The Stormer viscosity of the final product is about 125 R. P. M.

EXAMPLE 2

270 lbs. of commercial formaldehyde (37–40% free formaldehyde), 90 lbs. urea, and 30 lbs. urea-caseinate solution (10 lbs. of casein and 10 lbs. urea), prepared as directed under Example 1, are reacted by condensation following the procedure given in Example 1. The resulting glue contains approximately 45% solids, 50.7 $H_2O$ and about 4.2 free $CH_2O$.

EXAMPLE 3

270 lbs. formaldehyde, 50 lbs. urea, and 150 lbs. urea-caseinate solution (50 lbs. of casein and 50 lbs. of urea) are condensed to produce a glue following the procedure given in Example 1. The resulting glue contains approximately 43.7% solids, 53.3% $H_2O$ and 3% free $CH_2O$.

EXAMPLE 4

100 lbs. of urea and 100 lbs. of casein are added to 300 lbs. of water and heated to about 60–70° C. to prepare the casein urea solution. This 500 lbs. of urea-caseinate solution is then cooled to 45–50° C. and 270 lbs. of 37% formaldehyde is added. After adjustment of the pH to about 7 by adding sodium hydroxide or trisodium phosphate, the mixture is condensed following the procedure given in Example 1. In this example, it will be noted that no additional urea is used as a separate addition but all of the urea contained in the formula is used in preparing the urea-caseinate. The resulting glue contains approximately 33% solids, 65.5% water, and 1.5% free formaldehyde.

A comparison of the strength and bonding qualities of glues prepared according to this invention with commercial urea-formaldehyde resin glues is given in the following tables. The tests carried out to obtain the data in these tables were made by gluing $\frac{1}{16}''$ fir veneers together to form plywood. A prepared liquid glue was spread on both sides of a center or core veneer to obtain about 54.8 lbs. of liquid glue per 1000 square feet of double glue line panel. The face and back veneers were then laid on the glue spread center veneer and the three veneers pressed together in a hot plate press. The plywood was then removed from the press and allowed to season thoroughly, after which it was cut into small pieces for test purposes, tests being made with a series of dry strips on a Riehle testing machine, and another series of tests being made with strips that had been soaked in cold water for 48 hours. With glues A, B and C, a pressing temperature of 220° F. and a pressure of 125 lbs. per square inch for three and one-half minutes was used. With glues D, E and F, a pressing temperature of 230° F. and a pressure of 150 lbs. per square inch for four minutes was employed.

Table II

| Type of glue | Solids content of glue | Dry strength | Wet strength |
| --- | --- | --- | --- |
|  | Per cent |  |  |
| A. Commercial urea-formaldehyde | 62 | 250–80 | 230–45 |
| B. Example I | 45 | 255–95 | 240–60 |
| C. Example III | 44 | 255–75 | 230–40 |
| D. Glue A 100 parts+50 parts rye flour+50 parts water | 56 | 255–90 | 215–25 |
| E. Glue B 100 parts+50 parts rye flour+50 parts water | 47.5 | 255–100 | 220–40 |
| F. Glue C 100 parts+50 parts rye flour+50 parts water | 47 | 260–95 | 190–25 |

The foregoing table offers a comparison of glues of substantially the same viscosities and it is apparent that the glues of this invention provide at least as good, if not superior, bonding strengths in spite of their lower solids contents at the viscosities normally employed. The following table indicates the decidedly inferior strengths obtained when commercial urea-formaldehyde glues are diluted to the same solids content as the glues of this invention. In addition to the lower strengths obtained with the diluted glues, these diluted glues were rendered so thin as to be unsuitable commercially for spreading.

Table III

| Type of glue | Solids content of glue | Dry strength | Wet strength |
|---|---|---|---|
| G. Commercial urea-formaldehyde+water | Per cent 45 | 165–45 | 130–20 |
| H. Example I | 45 | 255–95 | 240–60 |
| I. Example III | 44 | 255–75 | 230–40 |
| J. Glue G+50 parts rye flour+50 parts water | 47.5 | 205–80 | 100–0 |
| K. Glue H+50 parts rye flour+50 parts water | 47.5 | 255–100 | 220–40 |
| L. Glue I+50 parts rye flour+50 parts water | 47 | 260–95 | 190–25 |

In using the above glues for hot plate pressing, 1 lb. of a hardening agent was added to each 100 lbs. of the resin glue. Ammonium chloride is suitable for this purpose and various other hardening agents of the type well known in the art, such as ammonium sulfate, sodium bisulfate, zinc chloride or other acidic salts can be used with glues prepared according to this invention, as well as with the usual urea-formaldehyde resin glues. The percentage of such hardening agents used in the liquid glue will, as is well known, alter to a considerable extent the speed of setting of the glue as soon as the hardening agent has been added.

Glues prepared according to this invention may be used also in the method of making plywood commonly known as "cold pressing" by the addition of a somewhat larger amount of the hardening agent. For example, with 2 lbs. of ammonium chloride to each 100 lbs. of liquid glue, glues prepared according to this invention may be spread on veneers at the rate of 60 lbs. of liquid glue per 1000 sq. feet double glue line, and the veneers then pressed at 150 lbs. pressure for 24 hours at room temperature. The following table offers a comparison of strengths of plywood glued by cold pressing using glues of substantially the same solids contents. 2% of ammonium chloride was added as the hardening agent to each of the glues tested.

Table IV

| Type of glue | Solids content | Dry strenght | Wet strength |
|---|---|---|---|
| M. Commercial urea-formaldehyde+water | Per cent 45 | 145–25 | 80–0 |
| N. Example I | 45 | 230–80 | 145–4 |
| O. Example II | 45 | 225–80 | 125–5 |

Casein-urea-formaldehyde glues prepared according to this invention are clearly reaction products of the three ingredients employed and are distinct in properties from straight urea-formaldehyde glues to which various carbohydrates or protein extenders have been added. By reacting the casein with the urea and formaldehyde according to this invention, a product of the requisite properties of a glue may be obtained with a very low total solids content, in some cases substantially less than 40%. Therefore, such products are much more economical to make than the straight urea-formaldehyde glues from which water must be evaporated during their preparation to obtain a satisfactory viscosity.

Although reaction products of this invention are particularly suited for use as wood glues, they may be used also for gluing paper, cloth and other materials or for finishing or sizing paper, cloth and the like. Because of the fact that large quantities of water, ranging up to 10 parts of water to one part of glue, can be added to the resin products of this invention without precipitating the resinous material, these products can be diluted easily to a consistency suitable for spraying in order to apply a thin coating or sizing on paper or textile goods.

Our resin products, in addition to their other properties, are not as sensitive to elevated temperatures. For example, the usual straight urea-formaldehyde resin glues with a life of 3 months at 70° F. revert to a gel in about 10 days at 110° F., whereas a product of this invention made by condensing 50 parts casein, 100 parts urea and 270 parts of 37% formaldehyde has a life of 3 months at 70° F. and does not revert to a gel until the end of about 17 days when stored at 110° F., a 70% improvement at the higher temperature. This property is especially important when the glues are shipped to warm climates where they may not be used immediately.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A urea-formaldehyde type resin product comprising a reaction product prepared by heating to a condensing temperature formaldehyde and a solution of casein reacted with a urea until a viscous tacky aqueous solution of a resin is obtained, the pH of the mixture being not substantially below about 5.5.

2. A resin type glue comprising a viscous homogeneous liquid prepared by heating to condense at an elevated temperature formaldehyde and an aqueous solution of casein reacted with a urea.

3. A resin type thermo-setting glue comprising a homogeneous viscous aqueous solution of a resin containing an acidic hardening compound, said resin comprising a condensation product prepared by condensing formaldehyde with a solution of casein and a urea, and neutralizing the product when a thick viscous solution is obtained.

4. A resin type glue comprising a thick viscous tacky aqueous solution of a resin containing less than 50% of solids and prepared by condensing together at an elevated temperature aqueous solutions containing formaldehyde and a reaction product of a urea and casein without evaporation of substantial quantities of water until a thick viscous reaction product is obtained.

5. A resin type glue comprising a viscous liquid prepared by heating to condense an aqueous solution containing a reaction product of casein and a urea with formaldehyde while maintaining the pH of the mixture below about 7 but not substantially below about 5.5, and neutralizing the product when a thick viscous reaction product is obtained.

6. A resin type glue comprising a resinous product obtained by mixing an aqueous solution containing a reaction product of casein and a urea with formaldehyde, adjusting the pH of the mixture to about 7, heating the mixture to produce a partial condensation of the ingredients, adjusting the pH of the heated material to a value below 7 but not substantially below about 5.5, thereafter heating to complete the condensation reaction to produce a thick viscous liquid, and neutralizing the reaction product.

7. A method of preparing a resin product comprising heating to a condensing temperature a solution containing a reaction product of a urea and casein with formaldehyde until a viscous aqueous solution of a condensation product is obtained, and controlling the pH of the solution during condensation to avoid precipitation of casein.

8. A method of preparing a resin type glue comprising forming an aqueous solution of a reaction product of casein and urea, and condensing said solution with formaldehyde under slightly acid conditions and at an elevated temperature until a viscous solution of a thermo-setting resin is obtained.

9. A method of preparing a resin type glue comprising forming an aqueous solution of a reaction product of casein and urea, and condensing said solution with formaldehyde and additional urea under slightly acid conditions and at an elevated temperature until a viscous solution of a thermo-setting resin is obtained.

10. A method of preparing a urea-formaldehyde type resin product comprising mixing an aqueous solution containing a reaction product of a urea and casein with formaldehyde, heating to condense said mixture under slightly acid conditions with the casein in solution and without evaporation of substantial quantities of water therefrom until a thick viscous reaction product is obtained, and neutralizing said product.

11. A method of preparing a urea-formaldehyde type resin product comprising mixing aqueous solutions of formaldehyde and a reaction product of casein with a urea, heating to condense said mixture under slightly acid conditions with the casein in solution and without evaporation of substantial quantities of water therefrom until a thick viscous reaction product is obtained, neutralizing said product, and adding an acidic hardening compound to said product.

12. A method of preparing a resin type glue comprising condensing together at an elevated temperature and a reaction product of casein and urea formaldehyde while maintaining the pH thereof below 7 but not substantially below about 5.5, and arresting the reaction when a thick liquid thermo-setting product is obtained by neutralizing said product.

13. A method of preparing a resin type adhesive comprising mixing together in aqueous solution casein, urea and formaldehyde, adjusting the pH of the mixture to about 7, heating the mixture to a condensing temperature and after partial condensation adjusting the pH to a value below 7 but not substantially below about 5.5, thereafter continuing the heating until a thick liquid resin is obtained, and neutralizing said resin.

14. A resin glue comprising a viscous aqueous solution of a resin prepared by dissolving casein in a solution of a urea to form at least a substantial portion of a urea-caseinate, mixing the solution with formaldehyde, refluxing the mixture under slightly acid conditions until a viscous homogeneous solution of condensate is formed, and promptly arresting the condensation reaction.

15. A resin glue comprising a viscous aqueous solution of a resin prepared by dissolving casein in a solution of a urea to form a reaction product, mixing the solution with formaldehyde, and heating the mixture at a condensation temperature under slightly acid conditions that maintain the casein in solution.

16. A method of preparing a resin glue comprising reacting casein in a solution with a urea, mixing the solution with formaldehyde, refluxing the mixture under slightly acid conditions until a viscous homogeneous solution of condensate is formed, and adding an alkaline material to arrest the condensation product.

17. A method of preparing a resin glue comprising reacting casein in a solution with a urea, mixing the solution with formaldehyde, and heating the mixture at a condensation temperature under slightly acid conditions that maintain the casein in solution.

CARL S. LEONARDSON.
DONALD J. WHITE.

CERTIFICATE OF CORRECTION.

Patent No. 2,332,519. October 26, 1943.

CARL S. LEONARDSON, ET AL.

It is hereby certified that error appears in the printed specification of the above numbered patent requiring correction as follows: Page 4, first column, line 64, Table IV, fourth column thereof, for "145-4" read --145-5--; page 5, second column, line 5, claim 12, before "and" insert --formaldehyde--; line 6, same claim, strike out "formaldehyde"; and that the said Letters Patent should be read with this correction therein that the same may conform to the record of the case in the Patent Office.

Signed and sealed this 4th day of January, A. D. 1944.

(Seal)

Henry Van Arsdale,
Acting Commissioner of Patents.